US 7,491,788 B1

(12) United States Patent  (10) Patent No.: US 7,491,788 B1
Leenders et al.  (45) Date of Patent: Feb. 17, 2009

(54) HIGH HEAT POLYCARBONATE COMPOSITIONS, METHODS FOR THE PREPARATION THEREOF, AND ARTICLES DERIVED THEREFROM

(75) Inventors: Chiel Albertus Leenders, Fijnaart (NL); Brian Mullen, Mt. Vernon, IN (US); Adam S Zerda, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 232 days.

(21) Appl. No.: 11/427,364

(22) Filed: Jun. 29, 2006

Related U.S. Application Data

(60) Provisional application No. 60/747,727, filed on May 19, 2006.

(51) Int. Cl.
*C08G 64/00* (2006.01)
*C07D 409/00* (2006.01)

(52) U.S. Cl. ............... 528/196; 548/466; 548/471; 548/472; 548/476

(58) Field of Classification Search ............ 528/196, 528/198; 548/466, 471, 472, 476
See application file for complete search history.

(56) References Cited

U.S. PATENT DOCUMENTS

| | | | |
|---|---|---|---|
| 4,134,936 A | 1/1979 | Byrne et al. | |
| 4,217,438 A | 8/1980 | Brunelle et al. | |
| 4,310,652 A | 1/1982 | DeBona et al. | |
| 5,344,910 A | 9/1994 | Sybert | |
| 5,455,310 A | 10/1995 | Hoover et al. | |
| 5,804,525 A | 9/1998 | Boden et al. | |
| 7,135,577 B2 | 11/2006 | Rai et al. | |
| 2005/0222334 A1 | 10/2005 | Srinivasan et al. | |
| 2005/0228137 A1 | 10/2005 | Srinivasan et al. | |

FOREIGN PATENT DOCUMENTS

| | | |
|---|---|---|
| EP | 0633292 | 1/1995 |
| EP | 1582549 | 10/2005 |
| JP | 06003838 A | 1/1994 |
| JP | 06082624 A | 3/1994 |
| JP | 2820277 B2 | 11/1998 |
| JP | 2005068216 A | 3/2005 |
| WO | 2006/127219 | 11/2006 |

OTHER PUBLICATIONS

JP03-070790; Publication Date: Mar. 26, 1991 (translation of abstract only).
Boranowska, Z. et al, "Badanie Odpornosci Poliweglanow Na Hydrolize W Srodowisku Zasadowyn" Polimery, Instytut Chemii Prrzemysowej, Warsaw, PL, vol. 15, No. 1, (1970), pp. 12-14.
Korshak, V.V. et al, "Cardo Polymers" Reviews in Macromolecular Chemistry, Marcel Dekker, Inc., New York, vol. C1, No. 1, (1974), pp. 45-142.
M.S. Lin, et al "Polymers With Improved Flammability Characteristics. I. Phenolphthalein-Related Homopolymers"; Journal of Polymer Science: Polymer Chemistry Edition, vol. 19, 2659-2670 (1981).
M.S. Lin, et al "Thermal Degradation Study of Phenolphthalein Polycarbonate", Journal of Polymer Scient: Polymer Chemistry Edition, vol. 19, 2773-2797 (1981).
International Search Report for International Application No. PCT/US2007/065867, mailed Aug. 16, 2007; 6 pages.
Written Opinion of the International Searching Authority for International Application No. PCT/US2007/065867, 5 pages.

*Primary Examiner*—Terressa M Boykin

(57) ABSTRACT

Melt blended compositions, comprising up to 20 wt % of an optional additive, and 80-100 wt % of a copolycarbonate having a Tg of 200° C. or more of (1)

$$-\left[R^1-O-\overset{O}{\underset{\|}{C}}-O\right]_x\left[R^2-O-\overset{O}{\underset{\|}{C}}-O\right]_y-, \quad (1)$$

wherein the mole ratio of x:y is 35:65 to 90:10, $R^1$ is derived from a dihydroxy compound (2)

(2)

[Structure of compound (2): phthalimidine-based bisphenol with $R^3_c$ and $R^5_c$ substituents on aromatic rings, $R^4$ on nitrogen, and two hydroxyphenyl groups]

wherein $R^3$ and $R^5$ are each independently a halogen or a $C_{1-6}$ alkyl group, $R^4$ is a $C_{1-6}$ alkyl, phenyl, or phenyl substituted with up to five halogens or $C_{1-6}$ alkyl groups, and each c is independently 0 to 4; $R^2$ is derived from a dihydroxy compound (6):

(6)

$$HO-\underset{(R^a)_p}{\text{Ar}}-X^a-\underset{(R^b)_q}{\text{Ar}}-OH$$

wherein $R^a$ and $R^b$ are each independently a halogen atom or a monovalent $C_{1-6}$ alkyl group; p and q are each independently integers of 0 to 4; and $X^a$ is a divalent group; and 95 to 5 wt % of a polycarbonate having a Tg of less than 200° C. of formula (9)

$$-R^9-O-\overset{O}{\underset{\|}{C}}-O-, \quad (9)$$

wherein $R^9$ derived from a dihydroxy compound of formula (6); and 0.001 to 0.1 wt % of a transesterification catalyst.

31 Claims, No Drawings

HIGH HEAT POLYCARBONATE COMPOSITIONS, METHODS FOR THE PREPARATION THEREOF, AND ARTICLES DERIVED THEREFROM

BACKGROUND OF THE INVENTION

This disclosure relates to polycarbonate compositions, and in particular to transparent polycarbonate compositions, methods of manufacture, and articles formed therefrom.

Polycarbonates are useful in the manufacture of articles and components for a wide range of applications, from automotive parts to electronic appliances. Because of their broad use, particularly in electronic applications or visually oriented applications such as light covers, see-through protective coverings, lenses, and transparent films, it is desirable to provide polycarbonates with excellent weatherability, impact strength, and transparency. Presently available polycarbonate films, for example, offer a number of advantages over poly(ethylene terephthalate) (PET) films, including higher heat distortion temperature (HDT), higher scratch resistance, and better performance under stringent environmental conditions. High temperature polycarbonates (polycarbonates having a glass transition temperature (Tg) of greater than about 200° C.) are expected to provide even better performance, but tend to be immiscible with other polymers, including other polycarbonates. Immiscibility can degrade physical properties, lead to processing difficulties, and lower optical clarity.

There accordingly remains a need in the art for methods for increasing the miscibility of high temperature polycarbonates with other polycarbonates. There also remains a need in the art for compositions that contain high temperature polycarbonates, wherein the compositions have advantageous properties such as heat stability and optical clarity.

SUMMARY OF THE INVENTION

The above-described and other deficiencies of the art are met by a melt-blended combination formed from, based on the total weight of the melt-blended composition,
0 to 20 wt % of an additive; and
80 to 100 wt % of a polymer composition, wherein the polymer composition comprises, based on the total weight of the polymer composition,
5 to 95 wt % of a high Tg copolycarbonate of formula (1)

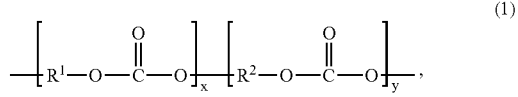

wherein the mole ratio of x:y is 35:65 to 90:10,
$R^1$ is derived from a dihydroxy compound of formula (2)

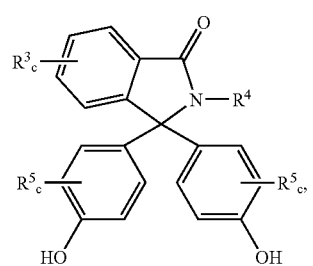

wherein $R^3$ and $R^5$ are each independently a halogen or a $C_{1-6}$ alkyl group, $R^4$ is a $C_{1-6}$ alkyl, phenyl, or phenyl substituted with up to five halogens or $C_{1-6}$ alkyl groups, and c is 0 to 4;

$R^2$ derived from a dihydroxy compound of formula (3)

wherein at least 60% of the $R^6$ groups are aromatic, and the dihydroxy compound of formula (3) is not the same as the dihydroxy compound of formula (2); and
wherein the high Tg copolycarbonate has a Tg of 200° C. or more; and
95 to 5 wt % of a polycarbonate of formula (9)

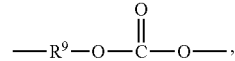

wherein at least 60% of the $R^9$ groups are aromatic, and the polycarbonate of formula (9) has a glass transition temperature of less than 200° C.; and
a transesterification catalyst.

In another embodiment, a method of manufacture of the above-described melt blended composition comprises melt blending the copolycarbonate of formula (1), the polycarbonate of formula (9), and a transesterification catalyst.

Still another embodiment comprises a melt blended composition formed by the foregoing process.

Articles comprising the foregoing melt blended composition are also within the scope of the present invention.

In still another embodiment, a method of manufacture of an article comprises molding, extruding, shaping, coating, or metallizing the above-described melt blended composition into an article.

The above described and other features are exemplified by the following detailed description.

DETAILED DESCRIPTION OF THE INVENTION

It has surprisingly been found by the inventors hereof that use of small amounts of a transesterification catalyst during the melt-blending of a high Tg copolycarbonate and a low Tg polycarbonate can render such a blend miscible and transparent. It has also surprisingly been found that the blends show improved molecular weight retention upon multiple heat cycles, as well as increased thermal stability. An optically clear thermoplastic polycarbonate composition having excellent physical properties can now be obtained using the melt-blended product of a high Tg copolycarbonate and a low Tg polycarbonate with a transesterification catalyst. Such reaction products have very low haze, that is, haze of less than 3% measured at 3.2 mm thickness according to the method of ASTM D1003-00. It has also unexpectedly been found that the compositions are advantageously processed using a single screw extruder at low concentrations of transesterification catalyst. In another embodiment, the compositions are advantageously processed using a twin screw extruder at even lower concentrations of transesterification catalyst.

As used herein, the term "high Tg copolycarbonate" and "high Tg copolycarbonate resin" means polymers comprising repeating structural carbonate units of formula (1):

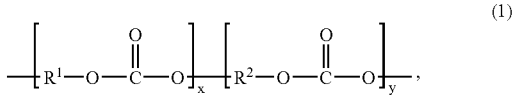

(1)

and having a Tg of 200° C. or greater, specifically 205° C. or greater, more specifically 210° C. or greater, and still more specifically 220° C. or greater. High Tg copolycarbonates of formula (1) can have a Tg as high as 280° C.

In formula (1), $R^1$ is derived from a dihydroxy compound of formula (2):

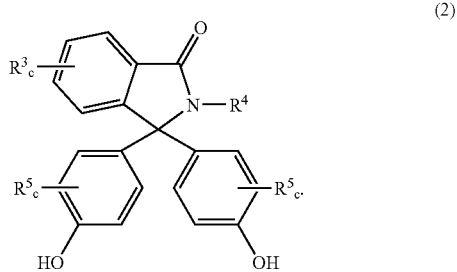

(2)

In formula (2), $R^3$ and $R^5$ are each independently a halogen or a $C_{1-6}$ alkyl group, $R^4$ is a $C_{1-6}$ alkyl, phenyl, or phenyl substituted with up to five halogens or $C_{1-6}$ alkyl groups, and c is 0 to 4. In a specific embodiment, $R^4$ is a $C_{1-6}$ alkyl or phenyl group. In still another embodiment, $R^4$ is a methyl or phenyl group. In another specific embodiment, each c is 0. In another specific embodiment, $R^1$ is a residue derived from 3-bis-(4-hydroxyphenyl)-2-phenyl-2,3-dihydroisoindol-1-one (BHPD), which has the following formula:

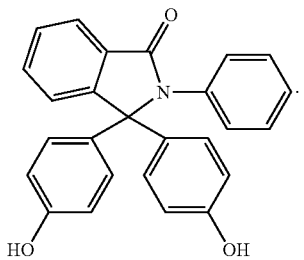

Further in formula (1), $R^2$ is derived from a dihydroxy hydrocarbylene compound of formula (3)

(3)

wherein at least 60% of the $R^6$ groups are aromatic, and the dihydroxy compound of formula (3) is not the same as the dihydroxy compound of formula (2). The dihydroxy hydrocarbylene of formula (3) contains two hydroxyl groups attached to a divalent $C_{1-36}$ hydrocarbon group, that is, a group containing carbon, hydrogen, and optionally one or more other heteroatoms such as oxygen, nitrogen, sulfur, or a halide. Exemplary hydrocarbyl groups include substituted and unsubstituted $C_{1-36}$ alkyl groups, substituted and unsubstituted $C_{3-36}$ cycloalkylene groups, and substituted and unsubstituted $C_{6-36}$ arylene groups, provided that at least 60% of the groups are aromatic.

For example, $R^6$ can have the structure of formula (4)

(4)

wherein each of $A^1$ and $A^2$ is independently a monocyclic divalent aryl radical, and $Y^1$ is —O—, —S—, —S(O)—, —S(O_2)—, —C(O)—, or a divalent, substituted or unsubstituted $C_{1-30}$ hydrocarbon. The carbonate units containing the residues of formula (4) can be produced by the reaction of dihydroxy compounds of formula (5)

(5)

wherein $Y^1$, $A^1$ and $A^2$ are as described above. Included are bisphenol compounds of general formula (6):

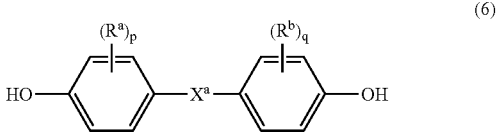

(6)

wherein $R^a$ and $R^b$ are each independently a halogen atom or a monovalent $C_{1-6}$ alkyl group; p and q are each independently integers of 0 to 4; and $X^a$ is a hydrocarbylene wherein one to four carbon atom separate the two phenyl rings. In one embodiment, $X^a$ represents one of the following groups:

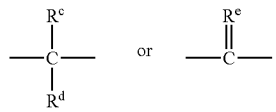

wherein $R^c$ and $R^d$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group. Exemplary $X^a$ groups are methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. A specific class of alkyl-substituted cyclohexylidenes can be derived from bisphenols of formula (7)

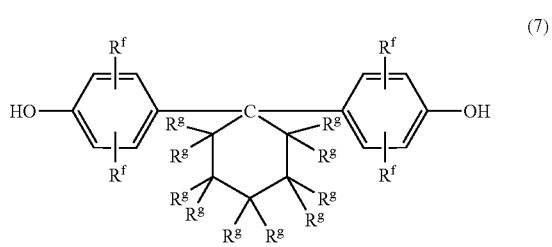

(7)

wherein each $R^f$ is independently hydrogen, $C_{1-12}$ alkyl, or halogen; and each $R^g$ is independently hydrogen or $C_{1-12}$ alkyl. Such cyclohexane-containing bisphenols, for example the reaction product of two moles of a phenol with one mole of a hydrogenated isophorone, are useful for making copolycarbonate polymers with high glass transition temperatures and high heat distortion temperatures.

Additional illustrative, non-limiting examples of suitable bisphenols include the following: bis(4-hydroxyphenyl)

methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), and the like, as well as combinations comprising at least one of the foregoing dihydroxy compounds.

Specific examples of bisphenol compounds that can be represented by formula (5) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl)propane, 1,1-bis(4-hydroxy-t-butylphenyl) propane, and 1,1-bis(4-hydroxy-3-methylphenyl)cyclohexane (DMBPC). Combinations comprising at least one of the foregoing dihydroxy compounds can also be used.

In the alternative, or in addition, $R^2$ can be derived from arylene-containing compounds such as 4,4'-dihydroxybiphenyl, 1,6-dihydroxynaphthalene, 2,6-dihydroxynaphthalene, or an aromatic dihydroxy compound of formula (8)

(8)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of such compounds include resorcinol, substituted resorcinol compounds such as 4-bromoresorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like, and catechol. Small amounts of carbonate units derived from hydroquinone or substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone can also be used.

The ratio of x:y in formula (1) is adjusted in order to obtain the desired physical properties, in particular Tg, molecular weight, low haze, high transmittance, melt processability, and the like. In order to obtain high Tg copolycarbonates, the ratio of x:y in formula (1) can be 35:65 to 90:10. Outside of these ranges, particularly at lower ratios, it can be difficult to achieve high molecular weight (e.g., a weight average molecular weight of greater than about 10,000, more specifically greater than about 20,000) and/or high Tg (e.g., a single Tg 200° C. or higher, or 210° C. or higher). At higher ratios, it can be difficult to achieve low haze, high transmittance, good melt processability, and/or a low yellowness index (YI) as described below. Useful copolycarbonates, particularly copolycarbonates with high optical clarity, can be obtained when the molar ratio of x:y in formula (1) is 40:60 to 90:10. In another embodiment, the ratio of x:y in formula (1) is 45:55 to 85:15.

The high Tg copolycarbonates can have a weight average molecular weight of 10,000 to 200,000, specifically 20,000 to 100,000 as measured by gel permeation chromatography (GPC), using a crosslinked styrene-divinylbenzene column and calibrated to polycarbonate references. GPC samples are prepared using methylene chloride as the solvent at a sample concentration of 1 mg/ml, and are eluted at a flow rate of 1.5 ml/min using methylene chloride as the eluent and toluene as an internal flow marker.

In an embodiment, the high Tg polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles can have an MVR, measured at 330° C./2.16 kg according to ASTM D1238-04, of 0.5 to 80 cubic centimeters per 10 minutes (cc/10 min). In a specific embodiment, a suitable polycarbonate composition has an MVR measured at 330° C./2.16 kg according to ASTM D1238-04, of 0.5 to 50 cc/10 min, specifically 0.5 to 45 cc/10 min, and more specifically 1 to 40 cc/10 min. Mixtures of polycarbonates of different flow properties can be used to achieve the overall desired flow property.

The high Tg copolycarbonate can have a light transmittance greater than or equal to 60%, specifically greater than or equal to 70% and more specifically greater than or equal to 80%, as measured at 3.2 millimeters thickness according to ASTM D1003-00. The polycarbonate can also have a haze less than or equal to 10%, specifically less than or equal to 5%, and most specifically less than or equal to 3%, as measured at 3.2 millimeters thickness according to ASTM D1003-00.

The high Tg copolycarbonate of formula (1) is melt-blended with a low Tg polycarbonate comprising units of formula (9)

(9)

and having a Tg of less than 200° C. In one embodiment, the Tg is less than 200° C., specifically less than 185° C., and more specifically less than 170° C. The $R^9$ groups are derived from compounds of formula (3) as described above, wherein the dihydroxy compound of formula (3) is not the same as the dihydroxy compound of formula (2). Specific examples of $R^9$ groups for use in the low Tg polycarbonate include the particular bisphenol compounds of formula (6). Specific examples of bisphenol compounds that can be represented by formula (6) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds can also be used.

In one specific embodiment, the low Tg polycarbonate is a linear homopolymer derived from bisphenol A, which each of $A^1$ and $A^2$ is p-phenylene and $Y^1$ is isopropylidene in formula (3). The low Tg polycarbonates can have a weight average molecular weight of 10,000 to 200,000, specifically 20,000 to 100,000 as measured by gel permeation chromatography (GPC), using a crosslinked styrene-divinylbenzene column and calibrated to polycarbonate references. GPC samples are prepared using methylene chloride as the solvent at a sample concentration of 1 mg/ml, and are eluted at a flow rate of 1.5 ml/min using methylene chloride as the eluent and toluene as an internal flow marker.

In an embodiment, the polycarbonate with a Tg below 215° C. has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles can have an MVR, measured at 300° C./1.2 kg according to ASTM D1238-04, of 0.2 to 80 cubic centimeters per 10 minutes (cc/10 min). In a specific embodiment, a suitable polycarbonate composition has an MVR measured at 300° C./1.2 kg according to ASTM D1238-04, of 0.4 to 50 cc/10 min, specifically 0.5 to 40 cc/10 min, and more specifically 1 to 30 cc/10 min. Mixtures of polycarbonates of different flow properties can be used to achieve the overall desired flow property.

The polycarbonate can have a light transmittance greater than or equal to 60%, specifically greater than or equal to 70% and more specifically greater than or equal to 80%, as measured at 3.2 millimeters thickness according to ASTM D1003-00. The polycarbonate can also have a haze less than or equal to 10%, specifically less than or equal to 5%, and most specifically less than or equal to 3%, measured at 3.2 millimeters thickness according to ASTM D1003-00.

The low Tg polycarbonates can be homopolycarbonates, copolymers comprising different $R^9$ moieties, or copolymers comprising carbonate units and other types of polymer units, such as ester units. Combinations comprising any one or more of the foregoing can also be used, for example a combination comprising a homopolycarbonate and a polyester-polycarbonate. As used herein, a "combination" is inclusive of blends, mixtures, alloys, reaction products, and the like. A specific type of copolymer is a polyester-polycarbonate, also known as a polyester-carbonate. Such copolymers further contain, in addition to recurring carbonate chain units of the formula (9), repeating units of formula (10):

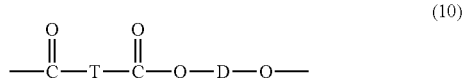

(10)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (5), specifically formula (6) above. In another embodiment, D is derived from an aromatic dihydroxy compound of formula (8) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate is derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. High Tg copolycarbonates are generally manufactured using interfacial polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 10. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

All types of polycarbonate end groups are contemplated as being useful in the high and low Tg polycarbonates, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A chain stopper (also referred to as a capping agent) can be included during polymerization. The chain-stopper limits molecular weight growth rate, and so controls molecular weight in the polycarbonate. Exemplary chain-stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates, particularly the low Tg polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl) carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing. In addition, useful transesterification catalysts for use can include phase transfer catalysts of formula $(R^3)_4Q^+X$ above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The relative amounts of the high Tg copolycarbonate of formula (1) and the polycarbonate of formula (9) used to form the melt-blended composition will depend on the desired physical properties of the melt-blended composition, processing parameters, and like considerations. In one embodiment, the melt-blended thermoplastic composition comprises 5 to 95 wt % of the high Tg copolycarbonate of formula (1), and 5 to 95 wt % of the polycarbonate of formula (9). In another embodiment, the melt-blended thermoplastic composition comprises 10 to 90 wt % of the high Tg copolycarbonate of formula (1), and 90 to 10 wt % of the polycarbonate of formula (9). In another embodiment, the melt-blended thermoplastic composition comprises 20 to 80 wt % of the high Tg copolycarbonate of formula (1), and 80 to 20 wt % of the polycarbonate of formula (9). All of the foregoing wt % values are based on the combined weight of the high Tg copolycarbonate of formula (1) and the polycarbonate of formula (9).

As described above, the high Tg copolycarbonate of formula (1) and the polycarbonate of formula (9) are melt-blended in the presence of a transesterification catalyst (also known as a redistribution catalyst). Without being bound by theory, it is believed that such melt-blending decreases or substantially eliminates formation of phase separated regions in the combined composition. Again, it being understood that the present invention is in no way limited by theory, it is believed that catalytically-induced exchange of carbonate groups across the interphase boundary between any phase separated regions compatibilizes the polymers by forming polymer chain links that span the interphase boundary, thereby decreasing or substantially preventing such phase-separated regions. It is further believed that elimination of these phase-separated regions provides a thermoplastic composition having very low scattering of incident light, and hence low haze.

Suitable transesterification catalysts include a wide variety of bases and Lewis acids. Specific examples of some transesterification catalysts, i.e., those that produce nearly equivalent or slightly lower molecular weight species, efficient transesterification, and low residual monomer, include tetraorganophosphonium hydroxides, tetraorganophosphonium carbonates, tetraorganophosphonium acetates, tetraorganophosphonium phenolates, tetraorganophosphonium bisphenolates, tetraorganoammonium hydroxides, tetraorganoammonium carbonates, tetraorganoammonium phosphites, tetraorganoammonium acetates, tetraorganoammonium phenolates, and tetraorganoammonium bisphenolates, wherein each organic group is the same or different, and is an unsubstituted or substituted $C_1$-$C_{10}$ alkyl, $C_3$-$C_{10}$ cycloalkyl, $C_6$-$C_{24}$ aryl, $C_7$-$C_{25}$ alkylaryl, or $C_7$-$C_{25}$ arylalkyl. Exemplary substituents include halogen; cyano; hydroxyl; nitro; $C_1$-$C_6$ alkyl groups; $C_3$-$C_6$ cycloalkyl groups; $C_1$-$C_6$ alkoxy groups; $C_6$-$C_{12}$ aryloxy such as phenoxy; $C_1$-$C_6$ aminoalkyl groups; $C_6$-$C_{12}$ aryl (e.g., phenyl, biphenyl, naphthyl, or the like, each ring being either a substituted or an unsubstituted aromatic); $C_7$-$C_{18}$ arylalkyl having 1 to 3 separate or fused rings (e.g., benzyl); or $C_7$-$C_{18}$ alkylaryl having 1 to 3 separate or fused rings. Combinations comprising at least one of the foregoing catalysts can also be used.

A specific class of transesterification catalyst includes a tetraorganophosphonium hydroxide, acetate, or phenolate that is decomposable under reaction conditions to very low levels of the active catalytic species, wherein each organic group is the same or different, and is a substituted or unsubstituted $C_1$-$C_{10}$ alkyl, $C_6$-$C_{18}$ aryl, $C_7$-$C_{25}$ alkylaryl, or $C_7$-$C_{25}$ arylalkyl, wherein the substituent(s) (if present) are as described above. In one embodiment, each organo group is the same and is an unsubstituted $C_1$-$C_{10}$ alkyl, $C_6$-$C_{12}$ aryl, $C_7$-$C_{13}$ alkylaryl, or $C_7$-$C_{13}$ arylalkyl. More specifically, each organo group is the same and is an unsubstituted $C_1$-$C_6$ alkyl, $C_6$-$C_{10}$ aryl, $C_7$-$C_{10}$ alkylaryl, or $C_7$-$C_{10}$ arylalkyl. The transesterification catalyst can be a tetra $C_1$-$C_6$ alkyl phosphonium hydroxide, a tetra $C_1$-$C_6$ alkyl phosphonium phenoxide, or a combination comprising at least one of the foregoing catalysts. Most specifically, the catalyst is tetrabutylphosphonium hydroxide (TBPH).

The transesterification catalyst is present in sufficient amount to compatibilize the polymers, and thus provide the desired balance of properties, including haze, yellowness index, notched Izod impact strength, and melt flow, but is not present in an excessive amount, because an excess can produce brittle, low molecular weight reaction product and/or a much more yellow, unstable reaction product. The optimal catalyst level will vary depending on the particular types of polymers and catalyst, and can be determined by testing and the guidelines provided herein. For example a transesterification catalyst can be used in amounts of 0.001% to 0.1%, or 10 to 1000 ppm of the combined weight of the high Tg copolycarbonate of formula (1) and the polycarbonate of formula (9). In one embodiment, the amount of transesterification catalyst is 10 to 220 ppm, specifically 20 to 200 ppm, more specifically 30 to 180 ppm of the combined weight of the high Tg copolycarbonate of formula (1) and the polycarbonate of formula (9).

In one embodiment the melt-blended composition is substantially free of phase separated regions. For example, a sample of the melt-blended composition (2 cm×2 cm×100 nm sections, stained with $RuO_4$ solution for 2 minutes, viewed at 66,000× magnification) shows no evidence of phase separated regions). In another embodiment, the melt-blended composition has a single Tg. The Tg can be 200° C. to 270° C., more specifically 210° C. to 250° C., even more specifically 215° C. to 240° C., or 220° C. to 230° C.

The melt-blended composition can have a low degree of scatter of incident light, and correspondingly a low or very low measurable haze level. In an embodiment, the melt-blended composition has a haze of less than 10%, specifically less than or equal to 5%, and more specifically less than or equal to 3%, measured at a thickness of 3.2 mm according to ASTM D1003-00. In another embodiment, the melt-blended composition has a haze of less than 1.7%, specifically less than or equal to 1.5%, and more specifically less than or equal to 1%, measured at a thickness of 3.2 mm according to ASTM D1003-00. Melt-blended compositions having low or very low haze can have high optical clarity and/or excellent surface finish.

In addition to the melt blended composition formed from the high Tg copolycarbonate of formula (1) and the polycarbonate of formula (9), a composition in accordance with the present invention can include various optional components ("additives") such as other polymers, including impact modifiers, and other additives ordinarily incorporated in resin compositions of this type, with the proviso that the optional components are selected so as to not significantly adversely affect the desired properties of the composition. Combinations of optional components can be used.

In one embodiment, small amounts of the additive(s) (for example those described below) can be present during the melt blending, provided that such additive(s) do not significantly adversely effect the desired properties of the melt-blend composition, e.g., Tg, haze, transparency, or melt viscosity. Such additives can be present in an amount of up to 20 wt. %, based on the total weight of the melt-blended composition, although smaller amounts are generally preferred, for example up to about 15 wt. %, up to about 10 wt. %, up to about 5 wt. %, or up to 1 wt %, each of the foregoing amounts being based on the total weight of the melt-blended composition. Such optional components are combined with the melt-blended high Tg copolycarbonate of formula (1) and the polycarbonate of formula (9) at a suitable time during or after the mixing of these components, prior to melt blending, or during melt blending. Different additives can be added at different times.

In one embodiment, the melt-blended composition is formed from a composition that consists essentially of the high Tg copolycarbonate of formula (1) and the polycarbonate of formula (9) in a weight ratio of 5:95 to 95:5, specifically 90:10 to 10:90, more specifically 20:80 to 80:20, and a transesterification catalyst at levels of 10 to 220 ppm, specifically 20 to 200 ppm, more specifically 30 to 180 ppm relative to the combined weight of the polymers. In this embodiment, no other additive is present during melt blending that would substantially significantly adversely affect the Tg, transparency, and/or haze of the melt-blended composition. In another embodiment, the melt-blended composition is formed from a composition that consists of the high Tg copolycarbonate of formula (1) and the polycarbonate of formula (9) in a weight ratio of 5:95 to 95:5, specifically 90:10 to 10:90, more specifically 20:80 to 80:20, and a transesterification catalyst at levels of 10 to 220 ppm, specifically 20 to 200 ppm, more specifically 30 to 180 ppm relative to the combined weight of the polymers. In this embodiment, no other additive is present during the melt-blending of the composition.

In still another embodiment, the melt-blended composition is formed from a composition wherein the polymer portion of the composition consists essentially of the high Tg copolycarbonate of formula (1) and the polycarbonate of formula (9) in a weight ratio of 5:95 to 95:5, specifically 90:10 to 10:90, more specifically 20:80 to 80:20, and a transesterification catalyst at levels of 10 to 220 ppm, specifically 20 to 200 ppm, more specifically 30 to 180 ppm relative to the combined weight of the polymers. In this embodiment, no other polymers are present during melt blending that would substantially significantly adversely affect the transparency, Tg, and/or haze of the melt-blended composition. In another embodiment, the melt-blended composition is formed from a composition wherein the polymer portion of the composition consists of the high $T_g$ copolycarbonate of formula (1) and the polycarbonate of formula (9) in a weight ratio of 5:95 to 95:5, specifically 90:10 to 10:90, more specifically 20:80 to 80:20, and a transesterification catalyst at levels of 10 to 220 ppm, specifically 20 to 200 ppm, more specifically 30 to 180 ppm relative to the combined weight of the polymers. In this embodiment, no other polymers are used to form the melt-blended composition.

Alternatively, the optional additive(s) are combined with the melt-blended composition after melt-blending. Specifically, where used, additives having acidic functionality (that can react with the transesterification catalyst and so affect its reactivity) are combined with the melt-blended product post-reaction. Other additives that can be added after melt blending include other polymers, for example other thermoplastic polymers such as polyesters and other, additional polycarbonates, including homopolycarbonates, copolycarbonates, polycarbonate-polysiloxane-copolymers, polyester-polycarbonate copolymers, and the like.

A wide variety of additive(s) can be used, including an impact modifier. Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Impact modifiers are generally present in amounts of 1 to 30 wt %, based on the total weight of the polymers in the melt-blended composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 1 to 200 wt %, based on the total weight of the polymers in the composition.

Exemplary antioxidant additives include, for example, organophosphites such as tris(nonyl phenyl)phosphite, tris(2, 4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.1 to 10 parts by weight, based on 100 parts by weight of all polymers in the composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.1 to 10 parts by weight, based on 100 parts by weight of polycarbonate resin and any impact modifier.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tertoctylphenyl)-benzotriazole and 2-hydroxy-4-n-octoxy benzophenone, or the like, or combinations comprising at least one of the foregoing light stabilizers. Light stabilizers are generally used in amounts of 0.1 to 10 parts by weight, based on 100 parts by weight of all polymers in the composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene) bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.1 to 10 parts by weight, based on 100 parts by weight of all polymers in the composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.1 to 10 parts by weight, based on 100 parts by weight of all polymers in the melt-blended composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.1 to 25 parts by weight, based on 100 parts by weight of all polymers in the melt-blended composition.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.1 to 10 parts by weight, based on 100 parts by weight of all polymers in the melt-blended composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.1 to 10 parts by weight, based on 100 parts by weight of polycarbonate resin and any impact modifier.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of 1 to 10 parts by weight, based on all polymers in the melt-blended composition.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl) phosphate, phenyl bis(3,5, 5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

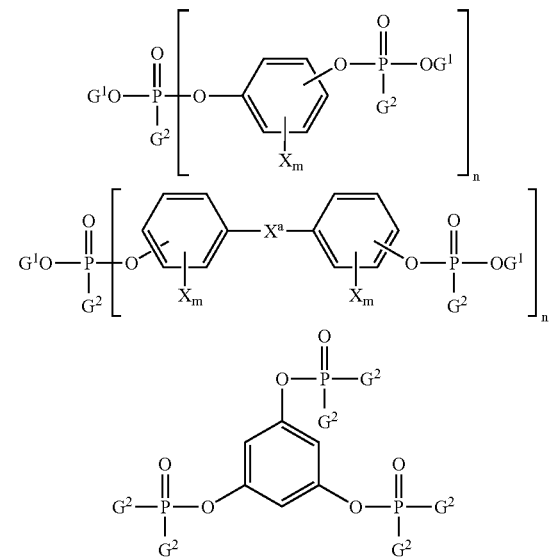

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When present, phosphorus-containing flame retardants are generally present in amounts of 1 to 50 parts by weight, based on 100 parts by weight of polycarbonate resin and any impact modifier.

Halogenated materials can also be used as flame retardants, for example halogenated compounds and resins of formula (11):

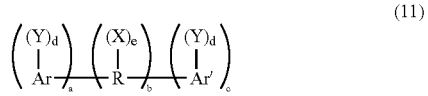

(11)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (11) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of 1 to 50 parts by weight, based on 100 parts by weight of all polymers in the melt-blended composition.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the thermoplastic composition it is based on the total weight of all polymers in the melt-blended composition.

Inorganic flame retardants can also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$, or the like. When present, inorganic flame retardant salts are generally present in amounts of 0.1 to 10 parts by weight, based on 100 parts by weight of all polymers in the melt-blended composition.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. Antidrip agents are generally used in amounts of 0.1 to 10 parts by weight, based on 100 parts by weight of all polymers in the melt-blended composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight, based on 100 parts by weight of all polymers in the melt-blended composition.

The melt-blended composition can further comprise a hydrolysis stabilizer. Typical hydrolysis stabilizers include carbodiimide-based additives such as aromatic and/or cycloaliphatic monocarbo-diimides substituted in position 2 and 2', such as 2,2',6,6'-tetraisopropyldiphenylcarbodiimide. Polycarbodiimides having a molecular weight of over 500 grams per mole are also suitable. Other compounds useful as hydrolysis stabilizers include an epoxy-modified acrylic oligomers or polymers, and oligomers based on cycloaliphatic epoxides. Specific examples of suitable epoxy-functionalized stabilizers include a cycloaliphatic epoxide resin available under the trade name ERL-4221, supplied by Union Carbide Corporation (a subsidiary of Dow Chemical), Danbury, Conn.; and those available under the trade name JONCRYL® ADR-4300 and JONCRYL® ADR-4368, from Johnson Polymer Inc, Sturtevant, Wis. Hydrolysis stabilizers can be used in amounts of 0.001 to 1 wt %, specifically 0.01 to 0.5 wt %, and more specifically 0.1 to 0.3 wt %, based on 100 parts by weight of all polymers in the melt-blended composition.

The melt-blended thermoplastic compositions can be manufactured by methods generally available in the art wherein the combination of copolymers, including the individual compositions of the copolymers, the specific catalyst, the relative amounts of these, and the reaction conditions (e.g., heat input, dispersion) are selected such that the method produces the desired composition, for example a homogeneous composition. For example, in one embodiment, in one manner of proceeding, powdered high Tg copolycarbonate of formula (1), polycarbonate of formula (9), and/or other optional components are first combined in a Henschel™ high speed mixer. Other low shear processes including but not limited to hand mixing can also accomplish this blending. The blend is then fed into the throat or feedthroat of an extruder via a hopper. Alternatively, one or more of the components can be incorporated into the composition by feeding directly into the extruder at the throat and/or downstream through a sidestuffer or feedport. Such additives can also be compounded into a masterbatch (i.e., a concentrate of the additive in a component polymer) with a desired polymeric resin and fed into the extruder. The extruder is generally operated at a temperature higher than that necessary to cause the composition to flow.

The transesterification catalyst can be blended with one or both of the polycarbonate powders in a mixer prior to extrusion, or it can be fed, e.g., as an aqueous solution, concomitantly down the throat of the extruder. The catalyst can be fed using a metering pump or by a calibrated gravity fed drip. The catalyst can be added diluted in a solvent such as water, at a concentration of 1 to 50 wt % of the solution.

The extrudate is immediately quenched in a water batch (typically filled with pure deionized low conductivity water) and pelletized (specifically in as clean and particulate free environment as practical). The pellets, as prepared when cutting the extrudate, can be one-fourth inch long or less as desired and can include be of a variety of shapes, from ellipsoid to circular in cross section. Such pellets can be used for subsequent extruding, molding, shaping, forming, coating, or metallizing. It is also generally known to be desirable to have as low a degree of fines (smaller particulates) as possible.

Other embodiments include articles comprising any of the above-described melt-blended compositions. For example, the article can comprise a film, sheet, metallized film or sheet, molded object, membrane, or composite, wherein the film, sheet, molded object, or composite has at least one layer comprising the composition. The melt-blended compositions can be made into articles using common thermoplastic processes such as film and sheet extrusion, injection molding, gas-assist injection molding, extrusion molding, compression molding, blow molding, and the like. Film and sheet extrusion processes can include melt casting, blown film extrusion, and calendaring. Co-extrusion, lamination, and metallization processes can be employed to form composite multi-layer films or sheets. Single or multiple layers of coatings can further be applied to the single or multi-layer substrates to impart additional properties such as scratch resistance, ultraviolet light resistance, aesthetic appeal, lubricity, and biocompatibility. Coatings can be applied through standard application techniques such as rolling, spraying, dipping, brushing, or flow-coating. Films and sheets of the melt-blended compositions can alternatively be prepared by casting a solution or suspension of the composition in a suitable solvent onto a substrate, belt, or roll followed by removal of the solvent.

Oriented films can be prepared through blown film extrusion or by stretching cast or calendared films in the vicinity of the thermal deformation temperature using conventional stretching techniques. For instance, a radial stretching pantograph can be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above can further be thermoplastically processed into shaped articles via forming and molding processes including but not limited to thermoforming, vacuum forming, pressure forming, injection molding and compression molding. Multi-layered shaped articles can also be formed by injection molding a thermoplastic resin onto a single or multi-layer film or sheet substrate as follows: (a) Providing a single or multi-layer thermoplastic substrate having optionally one or more colors on the surface, for instance, using screen printing or a transfer dye; (b) Conforming the substrate to a mold configuration such as by forming and trimming a substrate into a three dimensional shape and fitting the substrate into a mold having a surface which matches the three dimensional shape of the substrate; (c) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including but not limited to heat-setting, texturing, embossing, corona treatment, flame treatment, plasma treatment and vacuum deposition can further be applied to the above articles to alter surface appearances and impart additional functionalities to the articles.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like. Other representative weatherable articles that can be fabricated using the thermoplastic compositions provided herein include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and device; enclosures for electrical and telecommunication devices: outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; automotive headlamp lenses; fog lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; headlamp reflectors; fire helmets; cladding for satellite dishes; (coated helmets and personal protective equipment; coated synthetic or natural textiles; coated photographic film and photographic prints; coated painted articles; coated dyed articles; coated fluorescent articles; coated foam articles; and like applications. Additional fabrication operations can be performed on articles, such as, but not limited to molding, in-mold decoration, baking in a paint oven, vapor metallization, sputtering, hardcoating, lamination, and/or thermoforming.

In one embodiment, the melt-blended thermoplastic composition (or articles prepared therefrom) are transparent, that is, have a percent transmission of at least 60%, more specifically at least 70%, and most specifically at least 80%, measured according to ASTM D1003-00 on a molded sample having a thickness of 3.2 mm. The melt-blended thermoplastic composition can also have a haze of less than 10%, specifically less than 5%, and more specifically less than 3%, measured at a thickness of 3.2 mm according to ASTM D1003-00. Further, the thermoplastic compositions can have a yellowness index (YI) of less than or equal to 30, specifically less than or equal to 25, more specifically less than or equal to 20, as measured according to ASTM D1925 on 3.2 mm thick test specimens.

The melt-blended thermoplastic compositions have flow properties suitable for the manufacture of thin articles. Melt volume flow rate (often abbreviated MVR) measures the rate of extrusion of a thermoplastics through an orifice at a prescribed temperature and load. Melt-blended thermoplastic compositions suitable for the formation of thin articles can have an MVR, measured at 330° C./2.16 kg according to ASTM D1238-04, of 0.5 to 80 cubic centimeters per 10 minutes (cc/10 min). In a specific embodiment, a melt-blended thermoplastic compositions has an MVR measured at 330° C./2.16 kg according to ASTM D1238-04, of 0.5 to 50 cc/10 min, specifically 0.5 to 45 cc/10 min, and more specifically 1 to 40 cc/10 min. Mixtures of melt-blended thermoplastic compositions of different flow properties can be used to achieve the overall desired flow property.

The melt-blended thermoplastic compositions can further have a heat deformation temperature (HDT) of 130 to 200° C., for example 160 to 200° C., more specifically 140 to 190° C., even more specifically 160 to 180° C., each measured at 66 psi according to ASTM D648.

The melt-blended thermoplastic compositions can have a notched Izod impact strength of 1 to 18 foot pounds/inch (ft-lb/in), more specifically at least 2 to 16 ft-lb/in, measured according to ASTM D256-04 at 23° C. In general, the lower the HDT of the composition, the higher the impact strength. At 180° C. HDT, the impact strength is about 2, whereas at 160° C. HDT, the impact strength is about 11.

The melt-blended compositions can further have a % tensile elongation of 10 to 120%, or specifically 20 to 115%, measured in accordance with ASTM D256-04. Again, this property tends to be highly variable, depending on the HDT of the composition. The higher the HDT, in general, the lower the tensile elongation.

The melt-blended thermoplastic composition is further illustrated by the following non-limiting examples, wherein the melt-blended thermoplastic compositions were compounded on a Sterling single screw extruder (Length/Diameter (L/D) ratio of 24:1) or on a Werner & Pfleiderer co-rotating twin screw extruder (L/D ratio=30/1, vacuum port located near die face). The single screw extruders had essentially conveying elements. The twin screw extruders had enough distributive and dispersive mixing elements to produce good mixing between the polymer compositions. The compositions were subsequently molded according to ISO 294 on a Van Dorn or Husky injection-molding machine. Compositions were compounded and molded at a temperature of 285 to 350° C., although it will be recognized by one skilled in the art that the method can not be limited to these temperatures. Various of the compositions were subjected to the following tests.

Melt volume rate (MVR) was determined at 330° C. using a 2.16-kilogram weight, over 6 minutes, in accordance with ASTM D1238-04.

Heat deformation temperature (HDT) was determined on one-eighth inch (3.18 mm) bars per ASTM D648, at the pressures indicated.

Percent haze was determined for molded 3.2-mm thick laboratory scale samples using ASTM D1003-00.

Weight average molecular weight (Mw) was measured by gel permeation chromatography (GPC) using a crosslinked styrene-divinyl benzene column, methylene chloride as a solvent, at a sample concentration of 1 milligram per milliliter, and as calibrated with polycarbonate standards using toluene as an internal flow marker.

Thermal stability is analyzed by measuring the change in viscosity of the sample over a period of time under constant lower shear rates at temperature. The sample is melted in a plate-and-plate rheometer and subjected to 30 minutes of 1% strain rate at a constant frequency of 10 rad/sec. Stability is measured as a change in viscosity over that time period.

EXAMPLES 1-2 AND COMPARATIVE EXAMPLE A

Melt-blended compositions were formed from a high Tg copolycarbonate of formula (1) and a polycarbonate of formula (9) as follows:

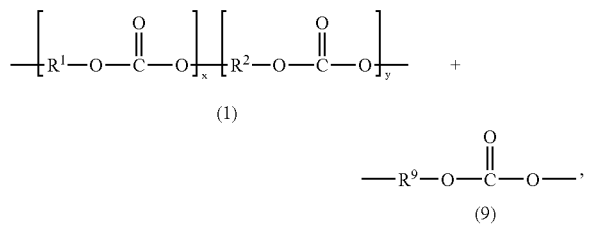

(1)

(9)

wherein the molar ratio of x:y is 49:51, $R^1$ is a residue derived from BHPD, and $R^2$ and $R^9$ are each a residue derived from bisphenol A. The two polymers, together with a phosphite stabilizer (1.8 g) and a transesterification catalyst, where indicated (TBPH), were melt-blended in a single screw extruder, using the amounts set forth in Table 1. Properties of the compositions are shown in Table 1.

TABLE 1

| Component | Example 1 | Example 2 | Example A |
|---|---|---|---|
| Formula (1), g | 1500 | 1500 | 1500 |
| Formula (2), g | 1500 | 1500 | 1500 |
| TBPH, ppm* | 80 | 160 | — |
| Property | | | |
| MW of Melt-blend | 27929 | 27008 | 27853 |
| % Change in MW after Molding | −2.3 | −6.9 | −9.3 |
| Appearance | transparent | transparent | opaque |
| Change in viscosity at 300° C. after 30 min dwell | −1 | −0.2 | −38 |
| Change in viscosity at 330° C. after 30 min dwell | 1.2 | −1.5 | 14.8 |
| Change in viscosity at 350° C. after 30 min dwell | −6.5 | −2.7 | −8.9 |
| Change in viscosity at 380° C. after 30 min dwell | −18.2 | −15.5 | −23.1 |

*added to the reaction in the form of a 40 wt % solution in water

As can be seen from the results shown in Table 1, samples melt-blended in the presence of a transesterification catalyst have molecular weights that are comparable to those melt-blended in the absence of a transesterification catalyst. The change in molecular weight after molding and the appearance of the samples is improved for both samples 1 and 2 in accordance with the invention. The improvement is greater when a smaller amount of catalyst is present (compare Example 1 vs. Example 2). Heat stability, as reflected by the change in viscosity of the samples is also improved for the samples melt-blended in the presence of a transesterification catalyst. However, greater heat stability is observed for the sample with the larger amount of catalyst.

EXAMPLES 3-5 AND COMPARATIVE EXAMPLES B-D

Melt-blended compositions were formed from a high Tg copolycarbonate of formula (1) and a polycarbonate of formula (9) as follows:

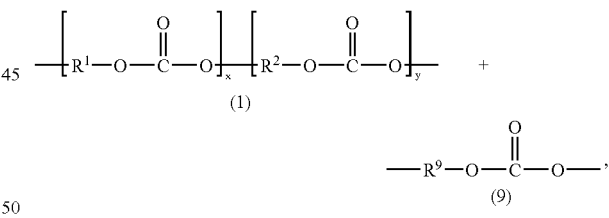

(1)

(9)

wherein the molar ratio of x:y is 49:51, $R^1$ is a residue derived from BHPD, and $R^2$ and $R^9$ are each a residue derived from bisphenol A. The two polymers, together with a phosphite stabilizer and a transesterification catalyst, where indicated (TBPH), were melt-blended in a single screw extruder, using the amounts set forth in Table 2. Samples were prepared and tested. Results are shown in Table 2.

TABLE 2

| Component | B | C | D | 3 | 4 | 5 |
|---|---|---|---|---|---|---|
| Formula (1), g | 530 | 640 | 745 | 475 | 650 | 825 |
| Formula (9), g | 470 | 360 | 255 | 525 | 350 | 175 |

TABLE 2-continued

| Component | B | C | D | 3 | 4 | 5 |
|---|---|---|---|---|---|---|
| TBPH, ppm* | — | — | — | 200 | 200 | 200 |
| Property | | | | | | |
| Appearance | opaque | opaque | opaque | transparent | transparent | transparent |
| Haze, % | 89 | 73 | 55.4 | 0.6 | 0.7 | 0.7 |
| HDT (0.45 MPa), °C. | 183 | 192 | 194 | 174 | 189 | 199 |
| HDT (1.8 MPa), °C. | 158 | 170 | 169 | 161 | 172 | 184 |

*added to the reaction in the form of a 40 wt % solution in water

As can be seen from the results shown in Table 2, use of a transesterification catalyst (Examples 3-5) greatly improves the transparency of the melt-blended compositions. The difference between HDT measured at 0.45 and 1.8 MPa is greater in samples that do not use the transesterification catalyst (Comparative Examples B, C, D). This is indicative of two distinct phases. The smaller difference between transesterified Example 3-5 indicates a one-phase system.

EXAMPLE 6 AND COMPARATIVE EXAMPLE E

To determine the effect of using a twin-screw extruder versus a single screw extruder, two melt-blended compositions were formed from a high Tg copolycarbonate of formula (1) and a polycarbonate of formula (9) as follows:

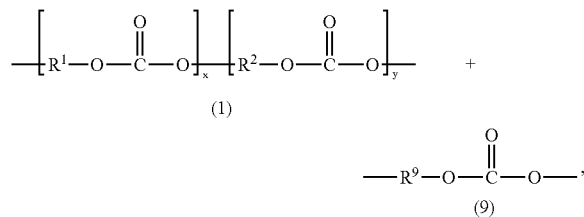

wherein the molar ratio of x:y is 49:51, $R^1$ is a residue derived from BHPD, and $R^2$ and $R^9$ are each a residue derived from bisphenol A. The two polymers, together with a phosphite stabilizer and a transesterification catalyst, where indicated (TBPH), were melt-blended in a twin screw extruder, using the amounts set forth in Table 3. Samples were prepared and tested. Results are shown in Table 3 (examples 6 and E), together with the results from Example 1.

TABLE 3

| Component | Example 1 | Example 6 | Example E |
|---|---|---|---|
| Formula (1), g | 1500 | 1500 | 1500 |
| Formula (2), g | 1500 | 1500 | 1500 |
| TBPH, ppm* | 80 | 80 | — |
| Property | | | |
| Appearance | transparent | transparent | opaque |
| Haze, % | 0.6 | 0.9 | 62.4 |
| MVR (330° C., 2.16 Kg), cc/10 min | 13.6 | 25.2 | 12.3 |

*added to the reaction in the form of a 40 wt % solution in water

Here, the results show an improvement in both transparency and MVR retention for the sample manufactured using a single-screw extruder (Example 1). The sample extruded on the twin-screw extruder exhibited a 2-fold increase in MVR (indicating a substantial molecular weight loss) and also became more yellow and brittle.

EXAMPLES 7-10

A milder twin screw extruder with fewer mixing elements has been shown to improve the processability of these blends. The two polymers, together with a phosphite stabilizer and a transesterification catalyst, where indicated (TBPH), were melt-blended in a twin screw extruder, using the amounts set forth in Table 4.

TABLE 4

| Component | Example 7 | Example 8 | Example 9 | Example 10 |
|---|---|---|---|---|
| Formula (1), g | 3000 | 3000 | 3000 | 3000 |
| Formula (2), g | 2000 | 2000 | 2000 | 2000 |
| TBPH, ppm* | 10 | 20 | 30 | 40 |
| Property | | | | |
| Appearance | translucent | transparent | transparent | transparent |
| Haze, % | 5.5 | 0.4 | 0.4 | 0.4 |
| MVR (330° C., 2.16 Kg), cc/10 min | 19.5 | 22.4 | 28.4 | 39.2 |

*added to the reaction in the form of a 40 wt % solution in water

The results in Table 4 show that whereas 10 ppm transesterification catalyst is not sufficient to result in a transparent blend under these conditions, 20 ppm and above result in a transparent sample. A shift in the MVR is observed with increasing amounts of transesterification catalyst. Here, the MVR doubles between 10 and 40 ppm transesterification catalyst.

Melt-blended combinations of high Tg copolycarbonates and polycarbonates generally yield immiscible, opaque compositions that have two different thermal softening points. These characteristics severely limit the range of applications in which these compositions can be used. Through the addition of a small amount of a transesterification catalyst, the same compositions can be rendered miscible and transparent, with greater thermal stability.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive of the endpoints and all intermediate values of the ranges. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "cycloalkyl" refers to a non-aromatic monovalent monocyclic or multicyclic hydrocarbon group having at least three carbon atoms, "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). Unless otherwise specified, a compound can be substituted with, depending on the available valencies, one or more of halogen; cyano; hydroxyl; nitro; $C_1$-$C_6$ alkyl; $C_3$-$C_6$ cycloalkyl; $C_1$-$C_6$ alkoxy; $C_6$-$C_{12}$ aryloxy such as phenoxy; $C_1$-$C_6$ aminoalkyl; $C_6$-$C_{12}$ aryl (e.g., phenyl, biphenyl, naphthyl, or the like, each ring being aromatic); $C_7$-$C_{18}$ arylalkyl having 1 to 3 separate or fused rings (e.g., benzyl); or $C_7$-$C_{18}$ alkylaryl having 1 to 3 separate or fused rings.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A melt-blended composition formed from, based on the total weight of the melt-blended composition,
   0 to 20 wt % of an additive; and
   to 100 wt % of a polymer composition, wherein the polymer composition comprises, based on the total weight of the polymer composition,
   5 to 95 wt % of a high Tg copolycarbonate of formula (1)

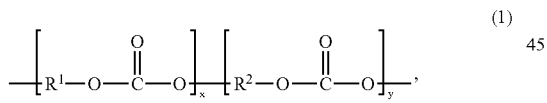

(1)

wherein the mole ratio of x:y is 35:65 to 90:10,
$R^1$ is derived from a dihydroxy compound of formula (2)

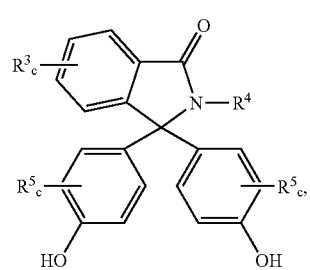

(2)

wherein $R^3$ and $R^5$ are each independently a halogen or a $C_{1-6}$ alkyl group, $R^4$ is a $C_{1-6}$ alkyl, phenyl, or phenyl substituted with up to five halogens or $C_{1-6}$ alkyl groups, and each c is independently 0 to 4;
$R^2$ is derived from a dihydroxy compound of formula (6):

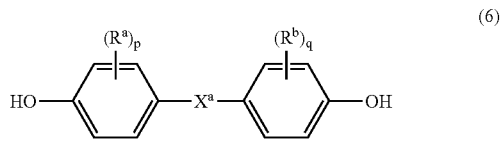

(6)

wherein $R^a$ and $R^b$ are each independently a halogen atom or a monovalent $C_{1-6}$ alkyl group; p and q are each independently integers of 0 to 4; and $X^a$ is methylene, cyclohexylmethylene, 2-[2.2.1]-bicycloheptylidene, ethylidene, isopropylidene, neopentylidene, cyclohexylidene, or cyclopentadecylidene; and
wherein the high Tg copolycarbonate has a Tg of 200° C. or more; and
95 to 5 wt % of a polycarbonate of formula (9)

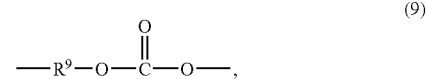

(9)

wherein $R^9$ is derived from a dihydroxy compound of formula (6)

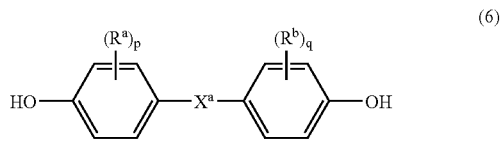

(6)

wherein $R^a$ and $R^b$ are each independently a halogen atom or a monovalent $C_{1-6}$ alkyl group; p and q are each independently integers of 0 to 4; and $X^a$ is methylene, cyclohexylmethylene, 2-[2.2.1]-bicycloheptylidene, ethylidene, isopropylidene, neopentylidene, cyclohexylidene, or cyclopentadecylidene; and
wherein the polycarbonate of formula (9) has a glass transition temperature of less than 200° C.; and
0.001 to 0.1 wt % of a transesterification catalyst.

2. The melt blended composition of claim 1, wherein no additive is present.

3. The melt blended composition of claim 1, wherein the polymer composition consists of high Tg copolycarbonate of formula (1) and the polycarbonate of formula (9).

4. The melt blended composition of claim 1, wherein the melt blended composition is transparent, wherein the melt blended composition has a haze of less than 10% measured according to ASTM D1003-00 using a molded sample having a thickness of 3.2 mm.

5. The melt blended composition of claim 1, having a single Tg.

6. The melt blended composition of claim 1, wherein $R^4$ is a $C_{1-6}$ alkyl or phenyl group.

7. The melt blended composition of claim 1, wherein each c is zero, and $R^4$ is a methyl or phenyl group.

8. The melt blended composition of claim 7, wherein $R^9$ is derived from a dihydroxy compound of formula (6):

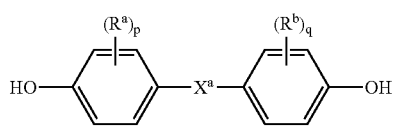

wherein each of p and q is zero and $X^a$ is isopropylidene.

9. The melt blended composition of claim 1, wherein $R^9$ is derived from a dihydroxy compound of formula (6):

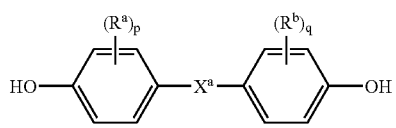

wherein each of p and q is zero and $X^a$ is isopropylidene.

10. The melt blended composition of claim 1, wherein the polycarbonate of formula (9) further comprises repeating units of formula (10):

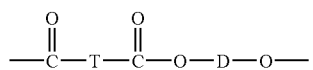

wherein D is a $C_{2-10}$ alkylene group, a $C_{6-20}$ alicyclic group, a $C_{6-20}$ aromatic group or a polyoxyalkylene group in which the alkylene groups contain 2 to 6 carbon atoms.

11. The melt blended composition of claim 1, wherein the transesterification catalyst is a tetraorganophosphonium hydroxide, a tetraorganophosphonium carbonate, a tetraorganophosphonium acetate, a tetraorganophosphonium phenolate, a tetraorganophosphonium bisphenolate, a tetraorganoammonium hydroxide, a tetraorganoammonium carbonate, a tetraorganoammonium phosphite, a tetraorganoammonium acetate, a tetraorganoammonium phenolate, a tetraorganoammonium bisphenolate, or a combination comprising at least one of the foregoing transesterification catalysts, wherein each organic group is the same or different, and is a substituted or unsubstituted $C_1$-$C_{10}$ alkyl, $C_3$-$C_{10}$ cycloalkyl, $C_6$-$C_{24}$ aryl, $C_7$-$C_{25}$ alkylaryl, or $C_7$-$C_{25}$ arylalkyl, wherein the substitution is a halogen, cyano, hydroxyl, nitro, $C_1$-$C_6$ alkyl, $C_3$-$C_6$ cycloalkyl, $C_1$-$C_6$ alkoxy, $C_6$-$C_{12}$ aryloxy, $C_1$-$C_6$ aminoalkyl, $C_6$-$C_{12}$ aryl, $C_7$-$C_{18}$ arylalkyl having 1 to 3 separate or fused rings, $C_7$-$C_{18}$ alkylaryl having 1 to 3 separate or fused rings, or a combination comprising at least one of the foregoing substitutions.

12. The melt blended composition of claim 1, wherein the transesterification catalyst is a tetraorganophosphonium hydroxide, a tetraorganophosphonium acetate, or a tetraorganophosphonium phenolate, wherein each organic group is the same or different, and is an unsubstituted $C_1$-$C_{10}$ alkyl, $C_6$-$C_{18}$ aryl, $C_7$-$C_{25}$ alkylaryl, or $C_7$-$C_{25}$ arylalkyl.

13. The melt blended composition of claim 1, wherein the transesterification catalyst is a tetra $C_1$-$C_6$ alkyl phosphonium hydroxide, a tetra $C_1$-$C_6$ alkyl phosphonium phenoxide, or a combination comprising at least one of the foregoing catalysts.

14. The melt blended composition of claim 1, further comprising an additional polymer, an impact modifier, a filler, a reinforcing agent, a thermal stabilizer, an antioxidant, a light stabilizer, a gamma-irradiation stabilizer, a plasticizer, a colorant, an antistatic agent, a lubricant, a mold releasing agent, a flame retardant, an anti-drip agent, or a combination comprising at least one of the foregoing additives.

15. The melt blended composition of claim 1, having a haze of less than 3% measured according to ASTM D1003-00 using a molded sample having a thickness of 3.2 mm.

16. The melt blended composition of claim 1, having an HDT of 160 to 200° C., measured at 66 psi according to ASTM D648.

17. The melt blended composition of claim 1, having an MVR, measured at 330° C./2.16 kg according to ASTM D1238-04, of 0.5 to 80 cubic centimeters per 10 minutes.

18. A melt blended composition, consisting essentially, based on the total weight of the composition, of a melt-blended combination of 30 to 70 wt % of a high Tg copolycarbonate of formula (1)

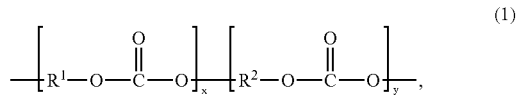

wherein the mole ratio of x:y is 40:60 to 60:40, $R^1$ is derived from a dihydroxy compound of formula (2)

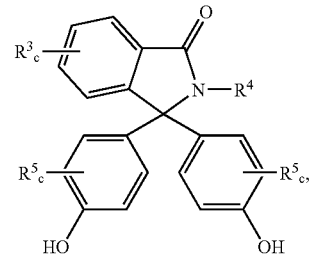

wherein $R^3$ and $R^5$ are each independently a halogen or a $C_{1-6}$ alkyl group, $R^4$ is a methyl or a phenyl group, and each c is 0 to 1;

$R^2$ is derived from a dihydroxy compound of formula (3)

HO—$R^6$—OH           (3), wherein at least 60% of the $R^6$ groups are aromatic, and the dihydroxy compound of formula (3) is not the same as the dihydroxy compound of formula (2); and wherein the high Tg copolycarbonate has a Tg of 200° C. or more; and 60 to 40 wt % of a polycarbonate of formula (9)

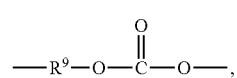

wherein at least 60% of the $R^9$ groups are aromatic, and the polycarbonate has a glass transition temperature of less than 180° C.; and 0.002 to 0.02 wt % of a transesterification catalyst, wherein the transesterification catalyst is a tetra $C_1$-$C_6$ alkyl phosphonium hydroxide, a tetra $C_1$-$C_6$ alkyl phosphonium phenoxide, or a combination comprising at least one of the foregoing catalysts.

19. The melt blended composition of claim 18, wherein the melt blended composition is transparent, wherein the melt blended composition has a haze of less than 10% measured according to ASTM D1003-00 using a molded sample having a thickness of 3.2 mm.

20. The melt blended composition of claim 18, wherein each c is zero and $R^4$ is a phenyl.

21. The melt blended composition of claim 18, wherein $R^9$ is derived from a dihydroxy compound of formula (6):

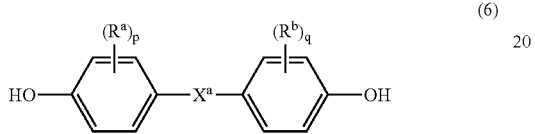

wherein each of p and q is zero and $X^a$ is isopropylidene.

22. The melt blended composition of claim 17, wherein each c is zero and $R^4$ is a phenyl.

23. A method of manufacture of a melt blended composition, comprising melt-blending a composition comprising, based on the total weight of the melt-blended composition,
  0 to 20 wt % of an additive; and
  to 100 wt % of a polymer composition, wherein the polymer composition comprises, based on the total weight of the polymer composition,
  5 to 95 wt % of a high Tg copolycarbonate of formula (1)

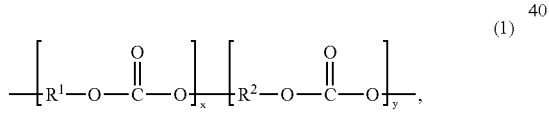

wherein the mole ratio of x:y is 35:65 to 90:10,
$R^1$ is derived from a dihydroxy compound of formula (2)

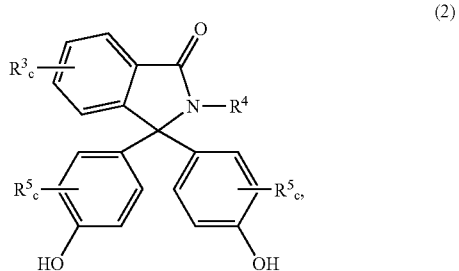

wherein $R^3$ and $R^5$ are each independently a halogen or a $C_{1-6}$ alkyl group, $R^4$ is a $C_{1-6}$ alkyl, phenyl, or phenyl substituted with up to five halogens or $C_{1-6}$ alkyl groups, and c is 0 to 4;

$R^2$ is derived from a dihydroxy compound of formula (6):

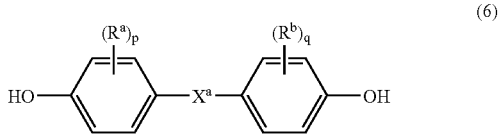

wherein $R^a$ and $R^b$ are each independently a halogen atom or a monovalent $C_{1-6}$ alkyl group; p and q are each independently integers of 0 to 4; and $X^a$ is methylene, cyclohexylmethylene, 2-[2.2.1]-bicycloheptylidene, ethylidene, isopropylidene, neopentylidene, cyclohexylidene, or cyclopentadecylidene; and
wherein the high Tg copolycarbonate has a Tg of 200° C. or more; and
95 to 5 wt % of a polycarbonate of formula (9)

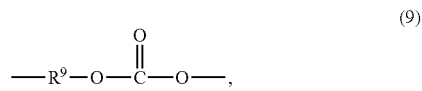

wherein $R^9$ is derived from a dihydroxy compound of formula (6)

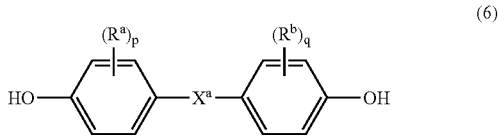

wherein $R^a$ and $R^b$ are each independently a halogen atom or a monovalent $C_{1-6}$ alkyl group; p and q are each independently integers of 0 to 4; and $X^a$ is methylene, cyclohexylmethylene, 2-[2.2.1]-bicycloheptylidene, ethylidene, isopropylidene, neopentylidene, cyclohexylidene, or cyclopentadecylidene; and
wherein the polycarbonate has a glass transition temperature of less than 200° C.; and
0.001 to 0.1 wt % of a transesterification catalyst.

24. A melt-blended melt blended composition formed by the method of claim 23.

25. An article comprising the melt-blended composition formed by the method of claim 23.

26. An article comprising the melt-blended composition of claim 1.

27. The article of claim 26, in the form of an automotive part.

28. The article of claim 26, wherein the article is transparent, wherein the melt blended composition has a haze of less than 10% measured according to ASTM D1003-00 using a molded sample having a thickness of 3.2 mm.

29. An article comprising the composition of claim 7, 8, 9, 18, 19, 20, 21, or 22.

30. The article of claim 29 in the form of an automotive part.

31. A method of manufacture of an article, comprising molding, extruding, coating, metallizing, or shaping the melt blended composition of claim 1 into an article.

* * * * *